US009740264B2

(12) United States Patent
Tsutsui

(10) Patent No.: US 9,740,264 B2
(45) Date of Patent: Aug. 22, 2017

(54) ELECTRONIC APPARATUS HAVING BATTERY CHARGE CIRCUIT AND CHARGE CONTROL METHOD THEREFOR

(71) Applicant: Kabushiki Kaisha Toshiba, Tokyo (JP)

(72) Inventor: Tomonori Tsutsui, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 128 days.

(21) Appl. No.: 14/661,959

(22) Filed: Mar. 18, 2015

(65) Prior Publication Data

US 2016/0036258 A1 Feb. 4, 2016

Related U.S. Application Data

(60) Provisional application No. 62/032,991, filed on Aug. 4, 2014.

(51) Int. Cl.
*H02J 7/00* (2006.01)
*G06F 1/32* (2006.01)
*G06F 1/26* (2006.01)
*H02J 7/04* (2006.01)

(52) U.S. Cl.
CPC ............ *G06F 1/3203* (2013.01); *G06F 1/263* (2013.01); *H02J 7/042* (2013.01)

(58) Field of Classification Search
CPC ...................................... H02J 7/042
USPC ......................................... 320/107
See application file for complete search history.

(56) References Cited

U.S. PATENT DOCUMENTS

| 7,002,265 B2* | 2/2006 | Potega ................. B60L 11/185 307/149 |
| 7,737,659 B2 | 6/2010 | Morioka |
| 2001/0000423 A1* | 4/2001 | Fischer ................ H02J 7/0008 320/114 |
| 2003/0054229 A1* | 3/2003 | Odaohhara ........ G01R 31/3648 429/61 |
| 2003/0117112 A1* | 6/2003 | Chen ..................... H02J 7/0073 320/137 |
| 2008/0224667 A1 | 9/2008 | Tanaka et al. |
| 2009/0115252 A1* | 5/2009 | Caraghiorghiopol ..... H02J 1/10 307/48 |
| 2012/0049804 A1 | 3/2012 | Kobayashi et al. |

FOREIGN PATENT DOCUMENTS

| JP | 2011-015481 | 1/2011 |
| JP | 2011-109840 | 6/2011 |

* cited by examiner

*Primary Examiner* — Yalkew Fantu
(74) *Attorney, Agent, or Firm* — Rutan & Tucker, LLP

(57) ABSTRACT

On embodiment provides an electronic apparatus including: a controller configured to perform a power management of the electronic apparatus; a battery capable of counting cycles of a charging; and a charge circuit configured to perform the charging to the battery by using DC power supplied from an AC power supply device, wherein the controller is configured to cause the charge circuit to step down a charge voltage of the battery every predetermined number of the counts.

8 Claims, 6 Drawing Sheets

ELECTRONIC APPARATUS HAVING BATTERY CHARGE CIRCUIT AND CHARGE CONTROL METHOD THEREFOR

CROSS-REFERENCE TO RELATED APPLICATION(S)

This application claims priority from U.S. Provisional Patent Application No. 62/032,991 filed on Aug. 4, 2014, the entire contents of which are incorporated herein by reference.

TECHNICAL FIELD

An embodiment of the invention relates to an electronic apparatus and a charge control method which is applied to the electronic apparatus.

BACKGROUND ART

A PC (Personal Computer) becomes configured so that a main battery is of the built-in type. Therefore, the user cannot intentionally replace the battery. In order to enable a PC to be used for a long period of time, consequently, it is important to extend the life of a battery which decreases in characteristic over time.

For example, a Li-ion battery has characteristics in which the cycle characteristic is improved by lowering the charge voltage. However, if the current/voltage of charging a battery is constant, the cycle characteristic can not be improved.

MODE FOR CARRYING OUT THE INVENTION

Hereinafter, an embodiment will be described with reference to FIGS. 1 to 7. First, the configuration of an electronic apparatus of the embodiment will be described with reference to FIG. 1. The electronic apparatus may be realized as one of various electronic apparatuses such as a notebook personal computer and a tablet terminal. Hereinafter, a case is supposed where the electronic apparatus is realized as a notebook personal computer 10.

Figure 1:
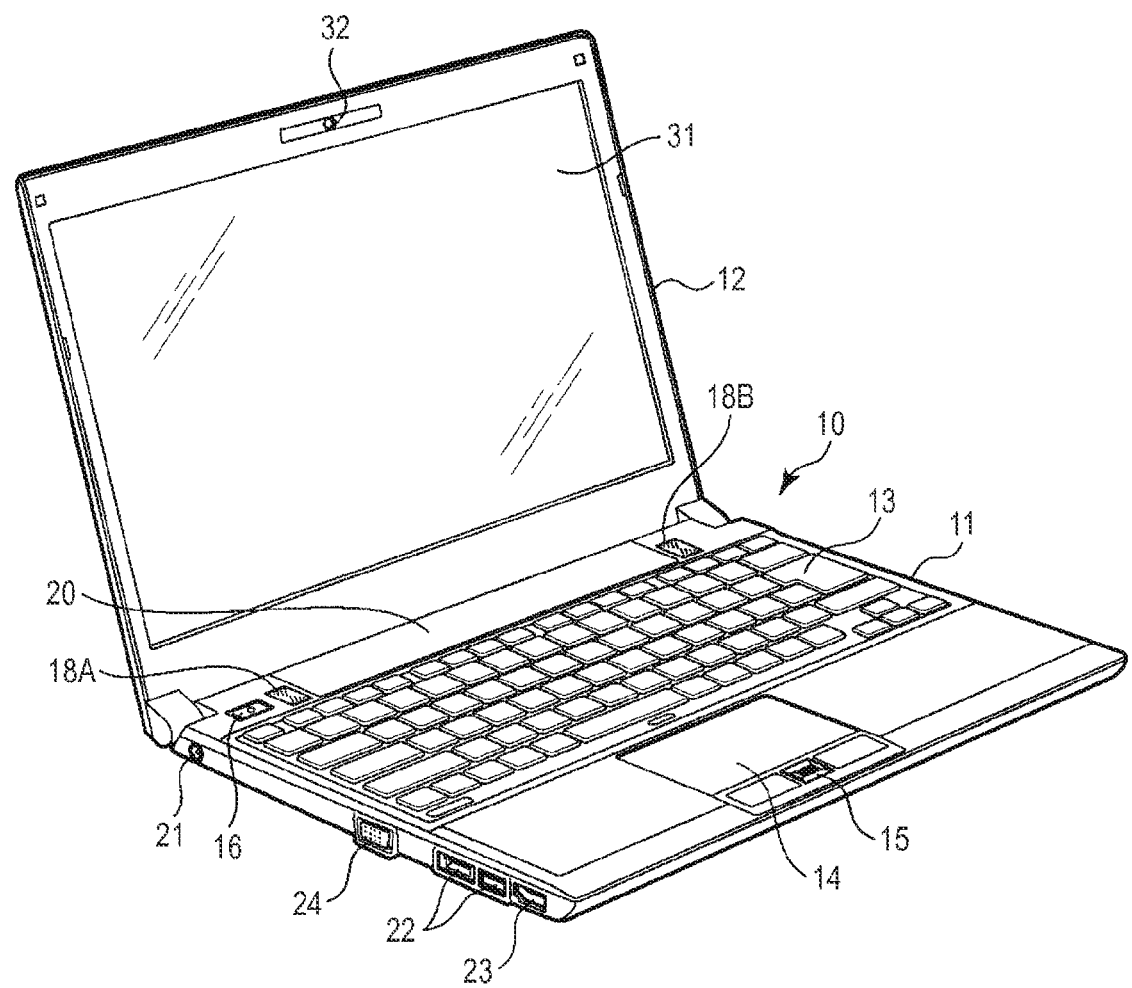
FIG. 1 A perspective view showing the appearance of an electronic apparatus of an embodiment.

FIG. 1 is a perspective view of the computer 10 in a state where a display unit is opened, as viewed from the front side. The computer 10 includes a computer body 11 and the display unit 12. A display device such as a liquid crystal display device (LCD) 31 is incorporated in the display unit 12. A camera (Web camera) 32 is placed in an upper end portion of the display unit 12. The computer 10 is configured to be powered by a battery 20.

The display unit 12 is swingably attached to the computer body 11 so as to be moved between an opened position at which the upper surface of the computer body 11 is exposed, and a closed position at which the upper surface of the computer body 11 is covered with the display unit 12. The computer body 11 has a housing shaped in a thin box. On the upper surface, a keyboard 13, a touch pad 14, a finger print sensor 15, a power switch 16 for powering ON/OFF the computer 10, and speakers 18A, 18B are placed.

Furthermore, a power supply connector (DC power supply input terminal) 21 is disposed in the computer body 11. The power supply connector 21 is disposed in a side surface, for example, the left side surface of the computer body 11. An external power supply device is detachably connected to the power supply connector 21. An AC adapter may be used as the external power supply device. An AC adapter is a power supply device which converts a commercial power supply (AC power) into DC power.

In some types, the battery 20 is detachably mounted on, for example, a rear end portion of the computer body 11. In the embodiment, however, it is assumed that the battery 20 is built in the computer 10.

The computer 10 is driven by power from the external power supply device or that from the battery 20. When the external power supply device is connected to the power supply connector 21 of the computer 10, the computer 10 is driven by the power from the external power supply device. The computer 10 is driven by the power from the battery 20 during a period when the external power supply device is not connected to the power supply connector 21 of the computer 10. Moreover, the power from the external power supply device is used also for charging the battery 20.

Furthermore, the computer body 11 is provided with some USB ports 22, an HDMI (registered trademark) (High-definition multimedia interface) output terminal 23, and an RGB port 24.

Figure 2:
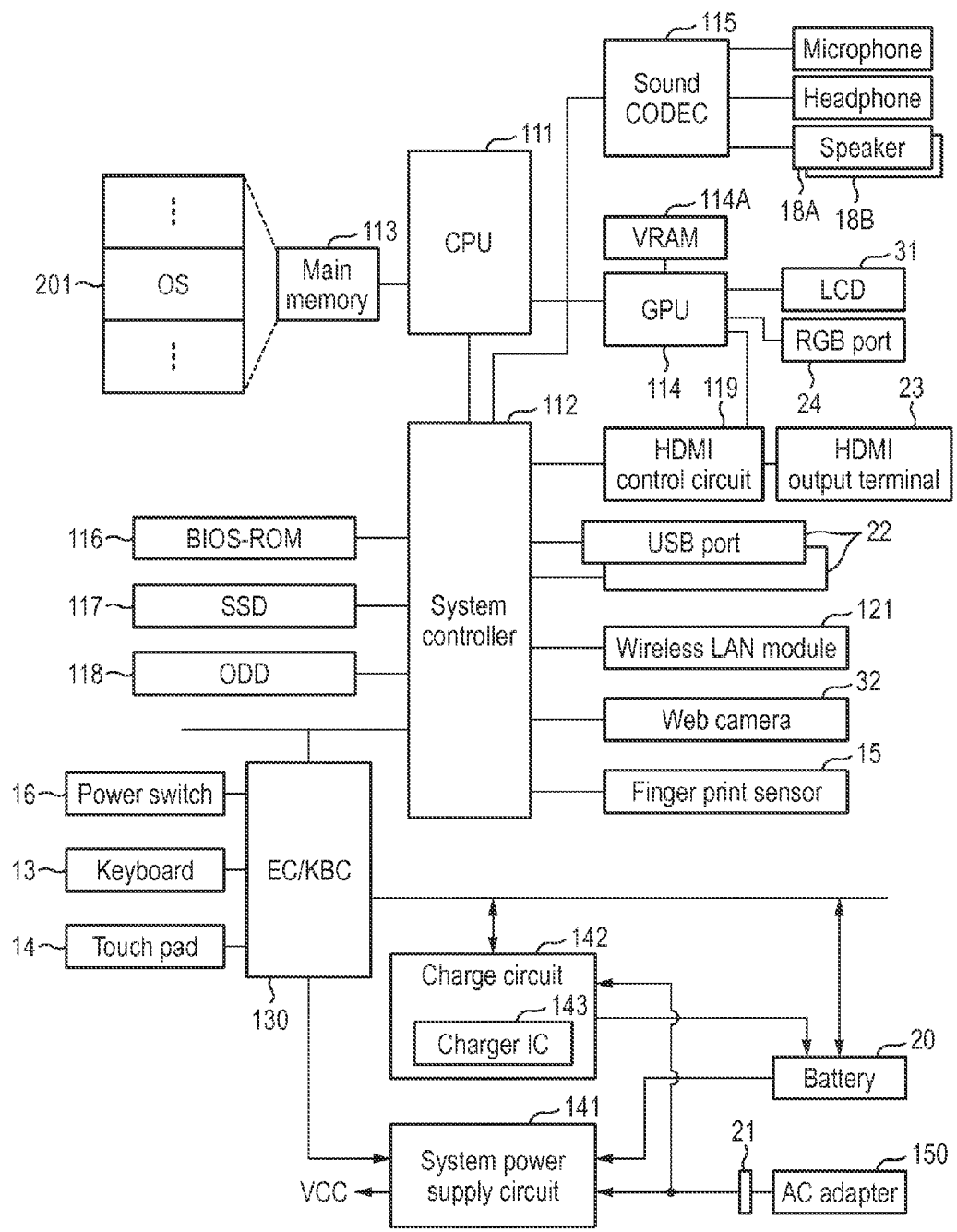
FIG. 2 A block diagram showing an example of the system configuration of the electronic apparatus of the embodiment.

FIG. 2 shows the system configuration of the computer 10.

The computer 10 includes a CPU 111, a system controller 112, a main memory 113, a graphics processing unit (GPU) 114, a sound CODEC 115, a BIOS-ROM 116, a solid state drive (SSD) 117, an optical disk drive (ODD) 118, a HDMI control circuit 119, a wireless LAN module 121, an embedded controller/keyboard controller IC (EC/KBC) 130, a system power supply circuit 141, a charge circuit 142, and the like.

The CPU 111 is a processor which controls the operations of the components of the computer 10. The CPU 111 executes various types of software which are loaded from the SSD 117 onto the main memory 113. The software includes an operating system (OS) 201, and the like.

Moreover, the CPU 111 also executes a basic input output system (BIOS) stored in the BIOS-ROM 116 which is a non-volatile memory. The BIOS is a system program for hardware control.

The GPU 114 is a display controller which controls the LCD 31 employed as a display monitor of the computer 10. The GPU 114 generates a display signal (LVDS signal) which is to be supplied to the LCD 31, from display data stored in a video memory (VRAM) 114A. Furthermore, the GPU 114 can also generate an analog RGB signal and an HDMI video signal from the display data. The analog RGB signal is supplied to an external display device through the RGB port 24. The HDMI output terminal 23 can transmit an HDMI video signal (non-compressed digital video signal) and a digital audio signal to the external display device by means of one cable. The HDMI control circuit 119 is an interface which sends the HDMI video signal and the digital audio signal to the external display device through the HDMI output terminal 23.

The system controller 112 is a bridge device which makes connection between the CPU 111 and each of the components. The system controller 112 incorporates a serial ATA controller for controlling the SSD 117.

The EC/KBC 130 is a power management controller which executes power management of the computer 10, and implemented as a one-chip microcomputer in which, for example, a keyboard controller for controlling the keyboard (KB) 13, the touch pad 14, and the like is incorporated. The EC/KBC 130 has a function to power ON and OFF the computer 10 in response to a manipulation by the user on the power switch 16. The control of powering ON/OFF the computer 10 is executed by a cooperative operation of the EC/KBC 130 and the system power supply circuit 141.

In the embodiment, it is possible to determine whether the battery 20 is in an overvoltage state or not, based on the state of the charge current. Specifically, when the battery 20 is charged, the firmware (F/W 54) of the EC/KBC 130 determines the start/stop of the charging of the battery 20 while checking the state of a Charger IC 143 in the charge circuit 142, and that of a Gas Gauge IC 52 in the battery 20. The Charger IC 143 is an IC for controlling the charging. The Gas Gauge IC 52 is an IC which is configured so as to provide information relating to various conditions of battery cells in the battery 20, to the host.

The system power supply circuit 141 is a power supply circuit which is configured so as to supply power (operation power Vcc) to components in the computer 10 by using the power (DC power) from the battery 20 or the power (DC power) from the AC adapter 150. A power input terminal of the system power supply circuit 141 is connected to the power supply connector 21. When the AC adapter 150 is connected to the power supply connector 21 through a power supply cable, therefore, the system power supply circuit 141 can receive the power (DC power) from the AC adapter 150.

Upon reception of an ON signal sent from the EC/KBC 130, the system power supply circuit 141 supplies operating power to the components of the computer 10. Upon reception of an OFF signal sent from the EC/KBC 130, the system power supply circuit 141 stops the supply of the operating power to the components.

The EC/KBC 130 can communicate with the charge circuit 142 and the battery 20 through a serial bus. The charge circuit 142 is a circuit for charging the battery 20 by using the DC power supplied from the AC adapter 150. The charge circuit 142 includes the Charger IC 143 which is configured so as to control a charge current and voltage which are output from the charge circuit 142 to the battery 20. The charge current is a regulated output current of the charge circuit 142, and used for charging the battery 20. The charge voltage is a regulated output voltage of the charge circuit 142, and also called a battery voltage.

The EC/KBC 130, the system power supply circuit 141, the charge circuit 142, and the Charger IC 143 operate also during a period when the computer 10 is powered OFF.

A charge control process in the embodiment will be described with reference to the block diagram of FIG. 3.

The battery 20 includes a battery cell 51, the Gas Gauge IC 52, a Protection IC 53, and the like. The charge circuit 142 is connected to the battery 20 through the + terminal (BATT+) of the battery 20 and the − terminal (BATT−) of the battery 20. The battery 20, the charge circuit 142, and the EC/KBC 130 are interconnected through an I2C (I²C) bus which is a serial bus, and communicable with one another. Alternatively, an SM bus (System Management bus) may be used in place of the I2C bus.

The EC/KBC 130 includes the firmware (F/W) 54. In the case where the following five conditions (1) to (5) are satisfied, the F/W 54 starts the charging of the battery 20.

(1) There is no error status in the Charger IC 143.
(2) There is no error status in the Gas Gauge IC 52 of the battery 20.
(3) Communication between the EC/KBC 130 and the Gas Gauge IC 52 is normal.
(4) The battery 20 is not fully charged.
(5) The battery 20 is not at overvoltage.

The condition (3) functions as a precondition for the other conditions (1), (2), (4) and (5).

As described above, the charge circuit 142 includes the Charger IC 143. The Charger IC 143 is an IC for controlling the charging of the battery 20. The Charger IC 143 includes a Charger IC Fault register 58 indicating whether there is an error status in the Charger IC 143 or not.

As to the condition (1), the F/W 54 refers to the Charger IC Fault register 58 to determine whether there is an error status in the Charger IC 143 or not.

Figure 3:
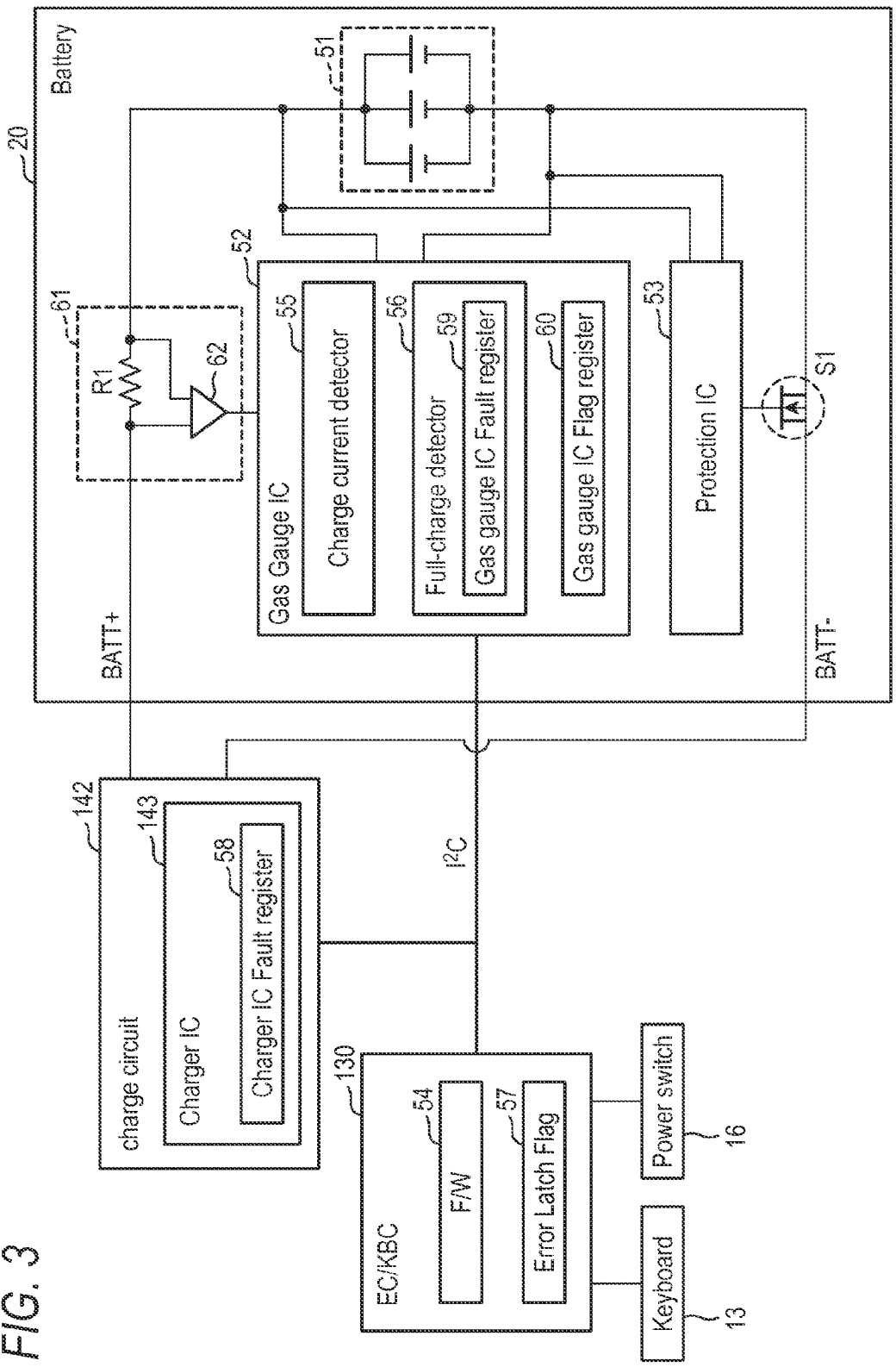
FIG. 3 A block diagram illustrating a charge control process executed by the electronic apparatus of the embodiment.

The battery cell 51 is configured, for example, by three cells each of which is a 1-series cell, and which are connected in parallel (1-series and 3-parallel) as shown in FIG. 3.

In the case where plural battery cells are connected in parallel as shown in FIG. 3, for example, an overvoltage occurs when the voltages of the battery cells are unbalanced.

The Gas Gauge IC 52 is connected to the positive and negative electrodes of the battery cell 51. The Gas Gauge IC 52 is a communication IC which communicates with the EC/KBC 130 through the I2C bus, whereby battery information can be sent to the EC/KBC 130. For example, the battery information is information indicating the value of the present charge current (hereinafter, referred to as charge current information), and information indicating whether the battery cell 51 is fully charged or not (hereinafter, referred to as full-charge information). Moreover, the Gas Gauge IC 52 performs a control related to the charging in the battery 20. Specifically, the Gas Gauge IC 52 calculates the remaining amount of the battery cell 51. For example, the remaining amount of the battery cell 51 is a ratio of the charged amount to the full-charge capacity.

The Gas Gauge IC 52 includes a charge current detector 55, a full-charge detector 56, and a Gas Gauge IC Flag register 60. The charge current detector 55 detects the charge current flowing through a charging line in the battery 20. The charging line is a line which connects the + terminal (BATT+) of the battery 20 and the − terminal (BATT−) of the battery 20 to each other. The Gas Gauge IC 52 can send the charge current information detected by the charge current detector 55, to the EC/KBC 130.

The charge current detector 55 detects the charge current by using, for example, a detection circuit 61. The detection circuit 61 has a charge current detection resistor R1 and a comparator 62. The detection circuit 61 detects the charge current based on the voltage across the charge current detection resistor R1.

The full-charge detector 56 detects whether the battery cell 51 is in a fully charged state or not. The full-charge detector 56 includes a Gas Gauge IC Fault register 59 which stores full-charge information. The full-charge detector 56 stores the full-charge information indicating whether the battery cell 51 is fully charged or not, in the Gas Gauge IC Fault register 59. The Gas Gauge IC 52 can send the full-charge information stored in the Gas Gauge IC Fault register 59, to the EC/KBC 130. Thus, as to the condition (4), the F/W 54 can refer to the Gas Gauge IC Fault register 59 to determine whether the battery 20 is fully charged or not.

The Gas Gauge IC 52 further includes the Gas Gauge IC Flag register 60 indicating whether there is an error status in the Gas Gauge IC 52 or not. As to the condition (2), the F/W 54 can refer to the Gas Gauge IC Flag register 60 to determine whether there is an error status in the Gas Gauge IC 52 or not.

In the case where at least the above-described four conditions are satisfied, the F/W 54 notifies the Charger IC 143 to start the charging, and the Charger IC 143 outputs the charge current to the battery 20, thereby starting the charging.

The Protection IC 53 is connected to the positive and negative electrodes of the battery cell 51. The Protection IC 53 turns ON or OFF a switch S1 which is disposed in the charging line. For example, the switch S1 is an FET.

The Protection IC 53 is an IC for monitoring the voltage of the battery cell 51. Specifically, the Protection IC 53 detects whether the voltage of the battery 20 (battery cell 51) is at overvoltage or not, based on the voltage across the battery 51 (hereinafter, referred to as battery cell voltage). In the case where the battery cell voltage exceeds a preset predetermined threshold during charging, more specifically, the Protection IC 53 determines that the voltage of the battery 20 (battery cell 51) is an overvoltage. In the case where an overvoltage is detected, the Protection IC 53 performs a control for changing the ON state of the switch S1 to the OFF state.

Hereinafter, the overvoltage of the battery 20 which is detected by the Protection IC 53 is referred to merely as the overvoltage, and the overvoltage of the battery 20 which is determined by the F/W 54 is referred to as the overvoltage state.

As described above, the F/W 54 starts the charging based on the above-described five conditions. In the case where the five conditions are satisfied, for example, the F/W 54 instructs the Charger IC 143 to output the charge current to the battery 20, thereby starting the charging.

Next, a process of detecting the overvoltage state of the battery 20 by the F/W 54 will be described.

In the case where the following four sub-conditions (1) are satisfied, as to the condition (5), the F/W 54 detects the overvoltage state of the battery 20. In this case, the charging of the battery 20 is stopped.

(1) The F/W 54 does not detect an abnormal state.
(2) The battery 20 is being charged.
(3) The charge current value is equal to or smaller than 50 mA.
(4) The Charger IC 143 does not reduce the charging because of a high load.

The four sub-conditions will be specifically described.

As to the sub-condition (1), the F/W 54 refers to an Error Latch Flag 57, and, at this time, can determine whether the charging is stopped because the battery 20 is in the overvoltage state, or not.

As to the sub-condition (2), the F/W 54 can communicate with the Charger IC 143 to determine whether the battery 20 is being charged or not. Alternatively, the F/W 54 may refer to the Error Latch Flag 57 to determine whether the battery 20 is being charged or not. In the case where the charging is being performed, and the F/W 54 refers to the Charger IC Fault register 58 of charger IC 143 to determine that there is no error information relating to the charging, the F/W 54 may determine that the sub-condition (2) is satisfied. Namely, the F/W 54 may determine that the battery 20 is being charged, based on the fact that the battery 20 is normally charged.

During a period when the battery 20 is charged by the Charger IC 143, the Gauge IC 52 can detect the charge current supplied to the battery cell 51. The Gauge IC 52 and the EC/KBC 130 are connected to each other through a communication line, and therefore the F/W 54 can periodically acquire information of the charge current from the Gauge IC 52.

As described above, in the case where the overvoltage of the battery cell 51 is detected, the Protection IC 53 turns OFF the switch S2. If the battery cell 51 is at overvoltage, therefore, the charging line is interrupted by the switch S2, and therefore the charge current value detected by the Gauge IC 52 is substantially zero. The sub-condition (3) (i.e., the charge current value is equal to or smaller than 50 mA) is whether the switch S1 is in the OFF state or not, namely, whether the Protection IC 53 detects the overvoltage of the battery cell 51 or not.

The sub-condition (4) is that the charge circuit 142 is not in a high load state in which the power available for charging the battery 20 is not limited. The term "is not in a high load state" means that, in the DC power supplied from the AC adapter, for example, the power available for charging the battery 20 is not limited. Specifically, the sub-condition (4) is whether the charge current value is not controlled by the Charger IC 143 so that the charge current value is smaller than a preset maximum value of the charge current. In the case where the power supplied from the AC adapter to the computer 10 is 30 W, and the maximum power which can be supplied for charging the battery 20 is 15 W, when 20 W is used for driving the system of the computer 10, specifically, the power available for charging the battery 20 is limited to 10 W. In the case where the power supplied to the battery 20 for charging the battery 20 is smaller than the maximum power which can be supplied for charging the battery 20 as described above, or where the value of the available charge current is reduced, the sub-condition (4) is not satisfied. The F/W 54 can communicate with the Charger IC 143 through the communication line to check whether the Charger IC 143 reduces the charge current or not.

As described above, by providing the sub-condition (4), it is possible to prevent the overvoltage which is caused in the case where the charging is reduced, from being erroneously detected. In other words, a situation where the overvoltage state is erroneously detected in a place where detection of the overvoltage is usually inhibited, and the charging is stopped can be prevented from occurring.

In the case where the charge current is reduced, the charge current is reduced (the charge current value is smaller than the maximum value of the charge current), and therefore the possibility of causing problems such as that heat is generated by step charging is low. In the case where the charge current is reduced, when the charging is unstopped, therefore, it is possible to prevent the problem in that the charging is not correctly performed, from occurring.

In the case where all of the four sub-conditions (1) to (4) are satisfied in this way, the F/W 54 determines that the battery 20 is in the overvoltage state, and stops the charging of the battery 20 by the charge circuit 142 (Charger IC 143).

By using the characteristics in which, in a lithium-ion battery, the cycle characteristic is improved by lowering the charge voltage, a control of switching the charge voltage in accordance with the cycle count is included.

Figure 4:
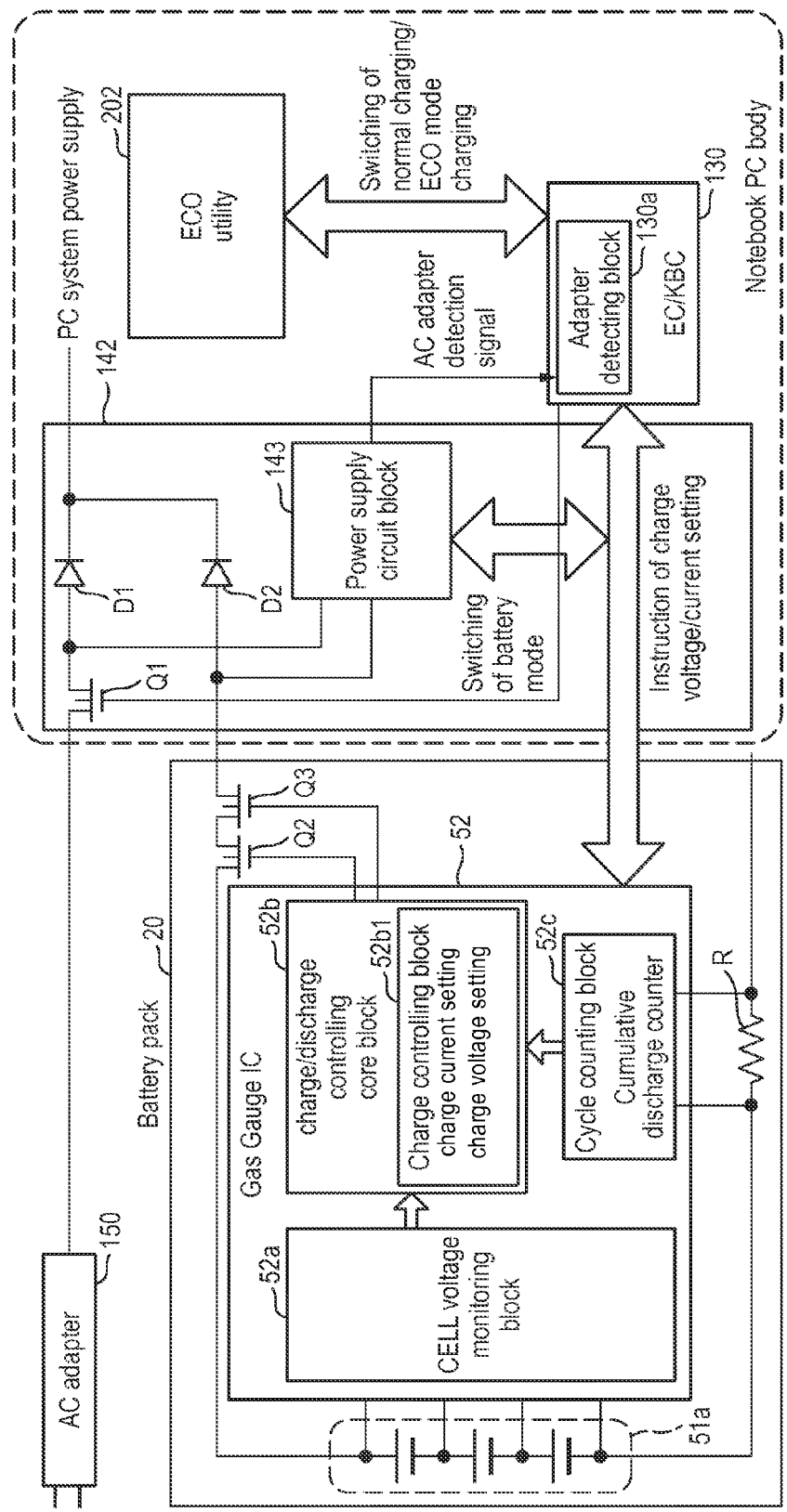
FIG. 4 A schematic block diagram showing the apparatus (system) of an example of the embodiment.

FIG. 4 shows the functional configuration of main portions of the embodiment which operates on the configuration of FIG. 3.

In the Gas Gauge IC 52, disposed are a CELL voltage monitoring block 52a, a charge/discharge controlling core block 52b including a charge controlling block 52b1, and a cycle counting block 52c including a cumulative discharge counter (not shown). In the example, a battery cell 51a (3-series type) which is different in type from the battery cell 51 is connected to the Gas Gauge IC 52 through the block 52a. Devices Q2, Q3 are used for, when an abnormal current is disposed to flow out from the battery cell 51a, enabling the CELL voltage monitoring block 52a to transmit a voltage drop due to the current to the charge/discharge controlling core block 52b, thereby leading to an interruption operation.

The cycle counting block 52c detects the number of charging and discharging cycles. One cycle is defined as follows.

In the case of a battery having a rating of 4,000 mAh, when the cumulative discharge amount in the battery driving reaches 4,000 mAh, for example, the cycle count is set to +1. The cumulative discharge amount is calculated by accumulating the value of the discharge current flowing through a resistor R.

The cycle counting block 52c notifies the charge/discharge controlling core block 52b of the cycle number, and the charge controlling block 52b1 of the charge/discharge controlling core block 52b sets the charge voltage and current according to the cycle count.

Figure 5:
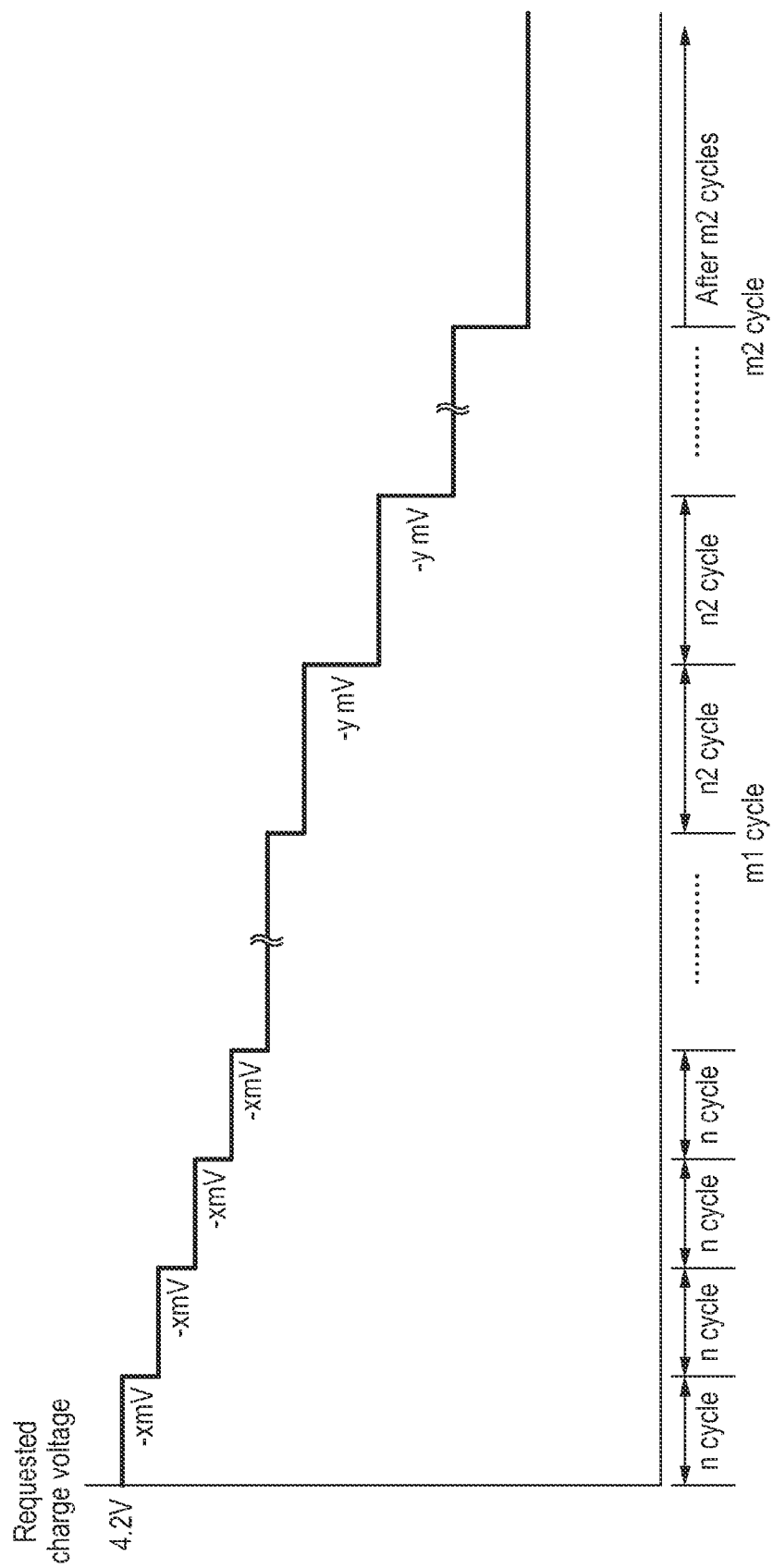
FIG. 5 A view showing a charge control method used in the embodiment.
Figure 6:
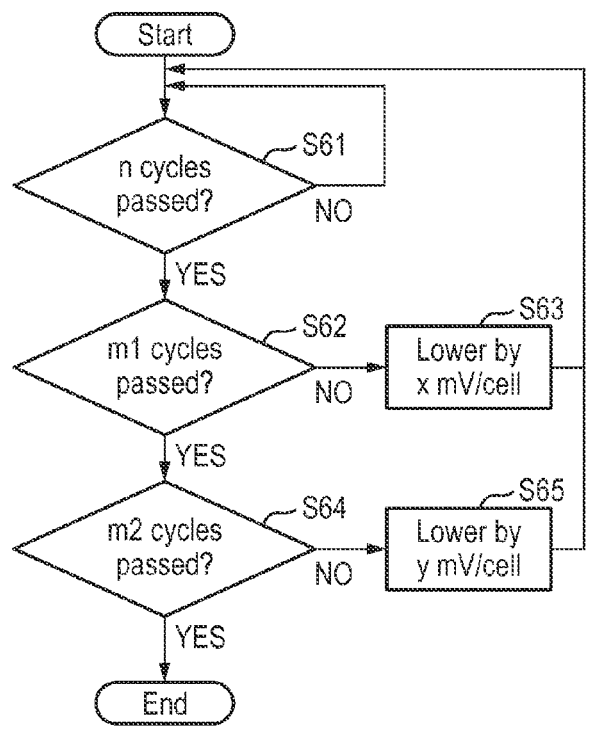
FIG. 6 A flowchart showing the charge control method used in the embodiment.

The charge voltage according to the cycle is determined as shown in FIGS. 5 and 6. In the example, the charging reducing period according to the cycle count is divided into 3 blocks.

(1) In the period of m1 cycles after the user starts the use, the charge controlling block 52b1 lowers by x mV/Cell every n cycles. When lowered every n cycles, there is an effect that the user hardly senses the full-charge capacity reduction.

(2) In consideration of a certain degree of elapse of passing of the user use period, during a period of (m1−m2) cycles, the charge controlling block 52b1 switches the lowering width of reduction of the charge voltage to y mV/Cell (y>x) every n2 cycles.

(3) After m2 cycles, there is no effect on the life of the battery, and therefore the charge controlling block 52b1 sets the value of the charge voltage constant.

Step S61: The charge controlling block 52b1 determines whether n cycles have passed or not. If passed, the flow transfers to next step S62, and, if not, the determination is repeated.

Step S62: The charge controlling block 52b1 determines whether a total of m1 cycles have passed or not. If passed, the flow transfers to next step S64, and, if not, the flow transfers to next step S63.

Step S63: The charge controlling block 52b1 lowers the charge voltage value by x mV/Cell, and the flow returns to step S61.

Step S64: The charge controlling block 52b1 determines whether a total of m2 cycles have passed or not. If passed, the flow ended, and, if not, the flow transfers to step S65.

Step S65: The charge controlling block 52b1 lowers the charge voltage value by y mV/Cell, and the flow then returns to step S61.

The charge voltage and current values which are set by the charge controlling block 52b1 are received by the EC/KBC 130 via the I2C communication with the Gas Gauge IC 52, and charge setting is performed on the power supply circuit block (Charger IC) 143.

The charge current value in a usual lithium-ion battery performs 0.7 C charging with respect to the design capacity. In the 0.7 C charging, the charge current value in a battery pack of 1 C=design capacity=4,000 mAh is 4,000 mAh× 0.7=2.8 A. Although the C rate varies depending on the characteristics of a cell, the 0.7 C charging will be described here.

In the case of the 0.7 C charging with respect to the design capacity, when the cycles proceed, the battery deteriorates, and the full charge capacity (FCC) changes. In the case where the FCC is lowered, when the charge current in charging is fixed, the battery is charged by the charge current value of 0.7 C or more, and the life of the battery is affected. At the start of charging, therefore, the FCC at the start of charging is set to 1 C, when the charge current is FCC×0.7, whereby a control of always keeping the charge current to 0.7 C is included. When the 0.7 C charging is kept, the life of the battery is enhanced.

In a battery pack in which the design capacity is 5,700 mAh, for example, the charge current value is 5,700 mAh× 0.7=3.99 A. When FCC=3,000 mAh at 600 cycles, the charge current value is 3,000 mAh×0.7=2.1 A, or reduced from 3.99 A to 2.1 A.

The core block 52b in the battery 20 calculates the value of the full-charge capacity, and, at the start of next charging, the value of the charge current of 0.7 C with respect to the FCC. The Gas Gauge IC 52 indicates the calculated charge current value to the EC/KBC 130 via the I2C communication. In accordance with the charge current value, the EC/KBC 130 sets the indicated charge current in the power supply circuit block 143, and charges the battery pack.

Figure 7:
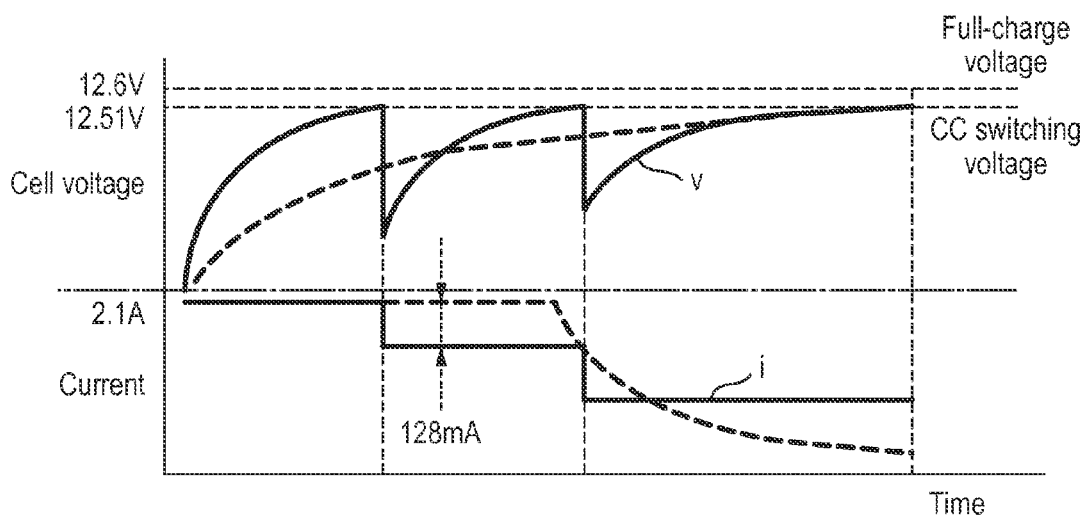
FIG. 7 A view of a charge control at a certain cycle count.

The charge control at a certain cycle count will be described with reference to FIG. 7. An example in which the charge control is performed on a PC having cylinder cells and the cycle count is 50 will be described. The abscissa in FIG. 7 shows the time at the cycle count, and the ordinate shows the charging value. In the ordinate, the portion above the dash-dot line shows the behavior of the voltage, and that below the dash-dot line shows the behavior of the corresponding current.

In the case of a battery pack of 3-series (three cylinder cells are connected in series) and 2-parallel (two cylinder cells are connected in parallel), conditions are as follows.

When the standard charge voltage is 12.6 V (4.2 V/Cell×3 series), 50 cycles and between 0 to m1 cycles, and therefore −x mV/n cycles are applied. As the reduction width of the charge voltage per cell, for example, the lowering value of the charge voltage is 50/n cycles×x mV=30 mV, and the charge voltage of 4.2 V is 4.2 V−30 mV=4.17 V.

From the reduction value of the voltage per cell, the charge voltage of the battery pack is 4.17 V/Cell×3 series=12.51 V. With respect to the charge current value, the charging is performed by 0.7 C of the FCC.

The CELL voltage monitoring block which is in the Gas Gauge IC detects the cell voltage. When the cell voltage in charging reaches 4.17 V, information is informed to the core block, and a new charge current is transmitted to the EC/KBC while reducing step by step, for example, in steps of 128 mA from the charge current (FCC×0.7).

The EC/KBC sets the changed charge current value into the power supply circuit block, and the battery is charged by the changed charge current value. Each time when the cell voltage reaches 4.17 V, the charge current is lowered, and, when lowered below the charge termination current, the control is performed with determining that the battery is fully charged.

In FIG. 7, v and i indicate embodiments of long life controls of the voltage and the current, and the corresponding broken lines indicate an existing charge control. An ECO utility 202 (see FIG. 4) which is one of power supply management application programs in the main memory 113 instructs the EC/KBC 130 which is a controller of the embodiment, to switch normal charging/ECO mode charging.

In order to solve the problem, the embodiment includes the control in which the charge voltage is lowered in accordance with the detection of charging and discharging cycles in the battery. As the control of reducing the charge voltage, the charge voltage calculation control is included in which the charge voltage is not uniformly reduced every cycle, but, in a certain cycle interval, a period when the charge voltage is kept constant, and a control of reducing the charge voltage in predetermined cycles are disposed, so that the user hardly senses a severe full-charge capacity reduction.

Also regarding the charge current value, although charging may be performed by a constant charge current value with respect to the design capacity, the charge control is performed with a charge current value corresponding to the full-charge capacity every battery cycle. Here are performed the fixed/variable hybrid charge voltage control according to the battery cycle, and the charge control at a charge current value corresponding to the full-charge capacity for every cycle.

In a Li-ion/polymer battery long-life charge control, as described above, the charge voltage (variable and fixed combination control) and the charge current value (FCC× 0.7) control are performed, whereby the life of a battery pack can be improved. The battery life is extended as compared with an existing product.

The invention is not limited to the embodiment, and may be further implemented by modifying in various manners without departing from the spirit of the invention.

Moreover, plural components disclosed in the above-described embodiment may be appropriately combined with each other, whereby various inventions may be formed. For example, some components may be omitted from the whole components indicated in the embodiment, and moreover components of different embodiments may be adequately combined with each other.

The invention claimed is:

1. An electronic apparatus including:
   a controller configured to perform a power management of the electronic apparatus;
   a battery configured to count cycles of a charging; and
   a charge circuit configured to perform the charging to the battery by using direct current (DC) power supplied from an alternating current (AC) power supply device, wherein the controller to (i) cause the charge circuit to step down a charge voltage of the battery by (a) a first step-down value for each power cycle during a first time period and (b) a second step-down value for each power cycle during a second time period, the second step-down value being larger than the first step-down value, and (ii) stop the stepping down of the charge voltage of the battery by the charge circuit at least during a third time period that occurs after the second time period.

2. The electronic apparatus of claim 1, wherein the first time period comprises first period number of cycles each lowering the charge voltage of the battery by the first step-down value being a first prescribed amount of voltage.

3. The electronic apparatus of claim 2, wherein the second time period comprises a second period number of cycles each lowering the charge voltage of the battery by the second step-down value being a second prescribed amount of voltage that is greater than the first prescribed amount of voltage.

4. The electronic apparatus of claim 1, wherein the controller communicates with the charge circuit through a serial bus.

5. The electronic apparatus of claim 1, wherein, each time when the charge voltage which varies on cycle by cycle is expected to exceed the stepped down charge voltage, the controller causes the charge circuit to execute stepping down of a charge current by a predetermined value.

6. A charge control method for an electronic apparatus that includes a controller configured to perform a power management of the electronic apparatus, a battery capable of counting cycles of a charging, and a charge circuit configured to perform the charging to the battery by using direct current (DC) power supplied from an alternating circuit (AC) power supply device, the method comprising:
   during a first time period, causing, by the controller, the charge circuit to conduct a stepwise reduction in a charge voltage of the battery by a first step-down value;
   during a second time period after the first time period, causing, by the controller, the charge circuit to conduct a stepwise reduction in the charge voltage of the battery by a second step-down value, the second step-down value being larger than the first step-down value; and
   during a third time period after the second time period, stopping the stepping down of the charge voltage of the battery by the charge circuit.

7. The method of claim 6, wherein the first time period comprises a first number of cycles each lowering the charge voltage of the battery by the first step-down value being a first prescribed amount of voltage.

8. The method of claim 6, wherein the second time period comprises a second period number of cycles each lowering the charge voltage of the battery by the second step-down value being a second prescribed amount of voltage that is greater than the first prescribed amount of voltage.

\* \* \* \* \*